Jan. 12, 1960  W. C. MEDERT ET AL  2,920,556
MACHINE FOR DECORATING ROUND SURFACES
Filed Nov. 21, 1956  3 Sheets-Sheet 1

INVENTORS
WARREN C. MEDERT
HARRY R. WONDERS
BY
Rule & Hoge.
ATTORNEYS

Fig. 3-A.

INVENTORS
WARREN C. MEDERT
HARRY R. WONDERS
BY
ATTORNEYS

Jan. 12, 1960 W. C. MEDERT ET AL 2,920,556
MACHINE FOR DECORATING ROUND SURFACES
Filed Nov. 21, 1956 3 Sheets-Sheet 3

INVENTORS
WARREN C. MEDERT
HARRY R. WONDERS
BY
Rule and Hoge
ATTORNEYS

United States Patent Office 2,920,556
Patented Jan. 12, 1960

2,920,556

MACHINE FOR DECORATING ROUND SURFACES

Warren C. Medert, Toledo, Ohio, and Harry R. Wonders, Streator, Ill., assignors to Owens-Illinois Glass Company, a corporation of Ohio Application November 21, 1956, Serial No. 623,665

4 Claims. (Cl. 101—38)

Our invention relates to machines for printing or applying decorative or other designs to round surfaces. As herein illustrated the machine is adapted for applying bands or other markings or decorations to the round surfaces of bottles and other articles.

The invention provides means for supporting the bottle or article to be decorated between a bottom chuck and a head chuck. The bottom chuck is continuously rotated, thereby rotating the article when gripped between the bottom chuck and head chuck. The ink or other decorating material is applied to the round surface of the rotating article by a decorating wheel or roll which is mounted for free rotation. The decorating roll is mounted in a swinging frame by which the roll is moved bodily into contact with a supply roll, referred to as the inking roll, by which the ink or decorating material is applied to the decorating roll. The decorating roll is then moved into contact with the rotating workpiece for applying the decorating material.

The movements bodily of the decorating roll between the inking roll and the workpiece are controlled by a combined pneumatic and electric control system. This system includes a valve, operable by a foot pedal, to open a pneumatic pressure line to a piston motor for moving the head chuck and gripping the workpiece between the chucks, thereby causing rotation of the workpiece. Opening of the air pressure line also operates through a timer device to supply air pressure to a second air motor by which the decorating roll is moved into contact with the rotating workpiece, thereby applying the decorating material. The timer device operates automatically to withdraw the decorating roll after contact with the workpiece for a predetermined time interval during which the workpiece may make one or more complete rotations about its axis.

Referring to the accompanying drawings:

Fig. 3A is a fragmentary view in section of a modified form of decorating roll;

Figure 1:
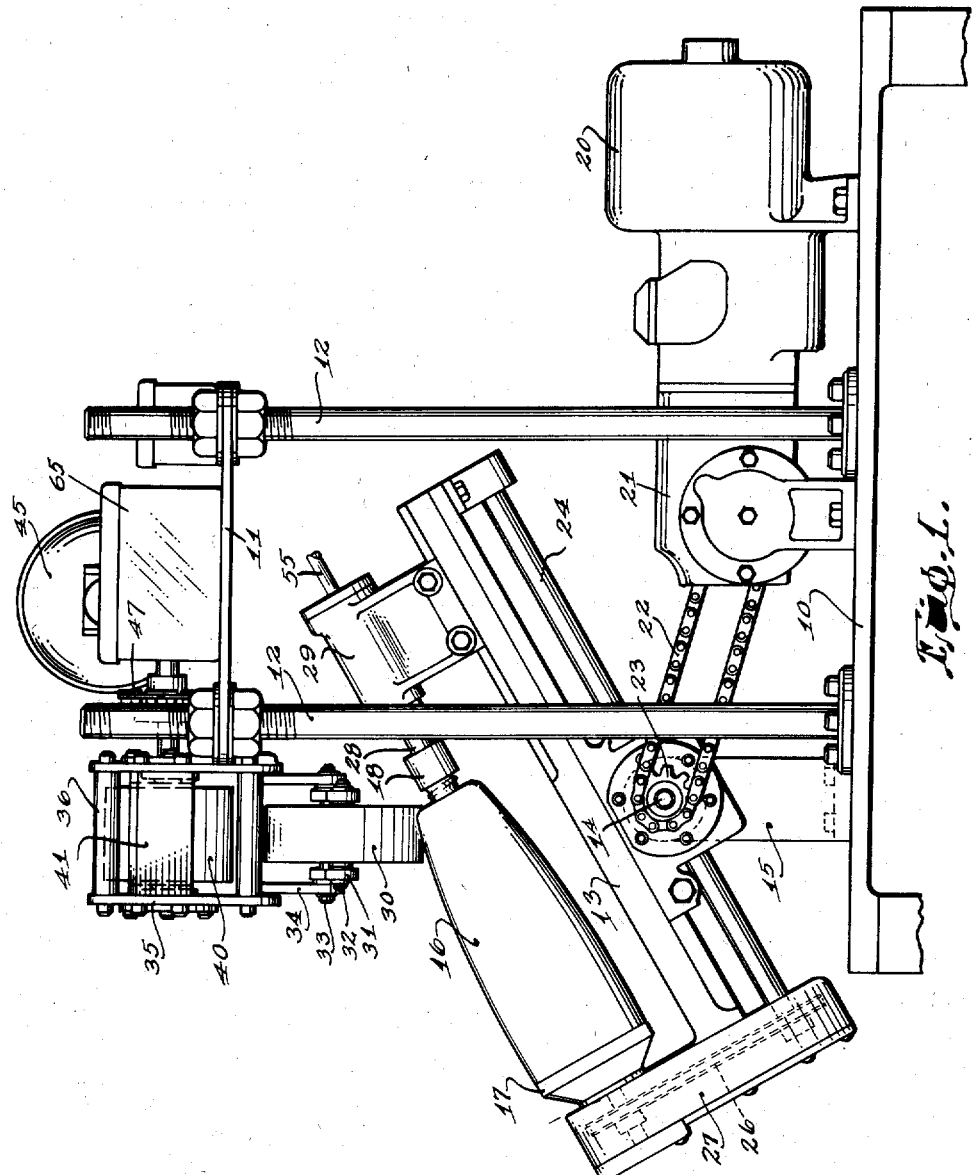
Fig. 1 is a side elevational view of the machine.
Figure 2:
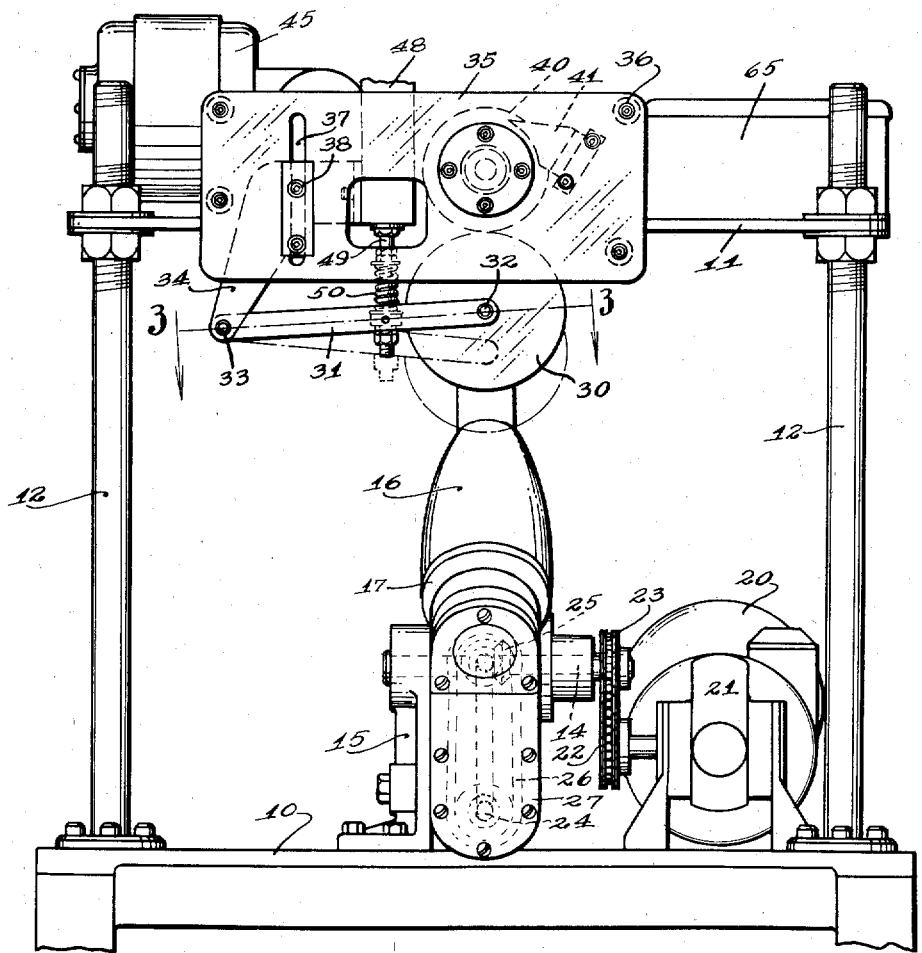
Fig. 2 is a front elevational view.

Referring to the drawings the operating parts are mounted on a framework comprising a lower platform or table 10 and an upper platform 11 mounted for vertical adjustment on standards 12 bolted to the platform 10. Means for supporting the workpiece during the printing or decorating operation includes a carrier 13 mounted for adjustment about the axis of a horizontal shaft 14 journalled in a supporting bracket 15. The workpiece 16, herein shown as a round bottle, is held between a base chuck 17 and a head chuck 18. The base chuck is continuously rotated by a continuously rotating motor 20 mounted on the platform 10. The motor has driving connection with the base chuck 17 through a train of gearing including a variable speed reduction gear 21 and a sprocket chain 22 trained over a sprocket 23 keyed to the shaft 14. The shaft 14 has driving connection with a shaft 24 journalled in the carrier 13. Such connection may include bevelled gears 25 (Fig. 2) connected respectively to the shafts 14 and 24. The shaft 24 operates through sprocket gears and chain 26 to drive the base chuck 17. The said chain 26 and gears are enclosed in a frame or casing 27 forming a part of the carrier 13. The mechanism for mounting and driving the workpiece as above described may be substantially the same as that shown in the patent to Jackson et al., 2,202,799, May 28, 1940, Stenciling Apparatus. The head chuck 18 is attached to the piston rod 28 of an air operated piston motor 29.

Figure 3:
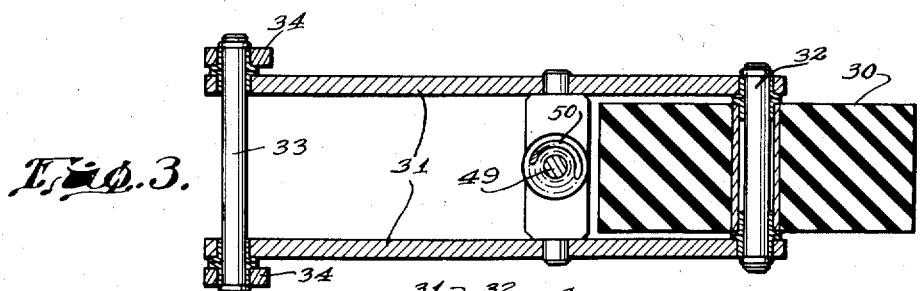
Fig. 3 is a section at the line 3—3 on Fig. 2 showing the decorating roll and swinging frame in which it is mounted.
Figure 4:
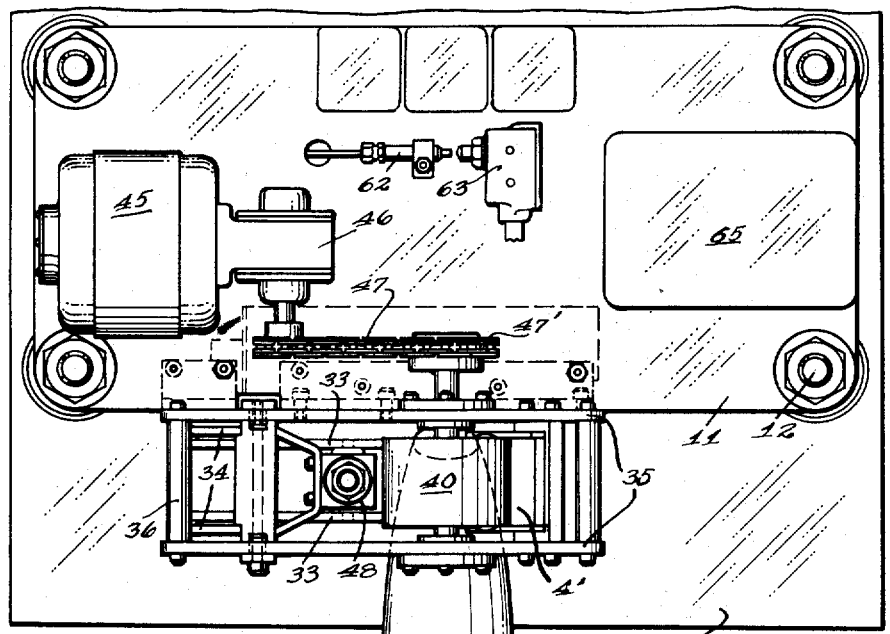
Fig. 4 is a plan view of the machine.

The decorating material is applied to the workpiece 16 by a decorating wheel or roll 30. The decorating material, consisting of ink or any one of various coloring materials in liquid or semi-liquid form, is herein referred to as ink, the roll 30 being referred to as the printing roll. The roll 30 as indicated in Fig. 3 consists of rubber or other soft resilient material adapted to yield under pressure to conform to the shape of the surface which is being printed. The roll is mounted in a swinging frame comprising parallel arms 31. The roll is rotatable about the axis of a shaft 32 mounted in the frame 31 at the free end thereof. The frame is mounted to swing about a shaft 33 carried in a bracket 34. The bracket is adjustable up and down in a frame 35 comprising parallel plates connected in horizontally spaced relation by spacing rolls 36. Slots 37 in the plates 35 and clamping bolts 38 carried by the bracket 34 permit vertical adjustment of the bracket in the frame 35 which has a fixed connection with the platform 11.

A roll 40, herein referred to as the inking roll, is mounted for rotation in the frame 35 and is positioned directly over the printing roll 30. The inking roll 40 is made of steel or other material providing a hard smooth cylindrical surface to which a thin film of the decorating material is applied from a container 41. The inking roll 40 is rotated continuously by an electric motor 45 mounted on the platform 11 and having a driving connection with the roll through a reduction gear 46 and sprocket chain 47, the latter trained over a sprocket wheel 47' on the shaft of the inking roll 40.

The decorating roll 30 is moved up and down by an air-operated piston motor 48 bolted to the bracket 34. The piston rod 49 of the motor is operatively connected to the frame 31 through a coil compression spring 50. The spring is adjustable for adjusting the degree of pressure of the roll 30 on the workpiece.

Figure 5:
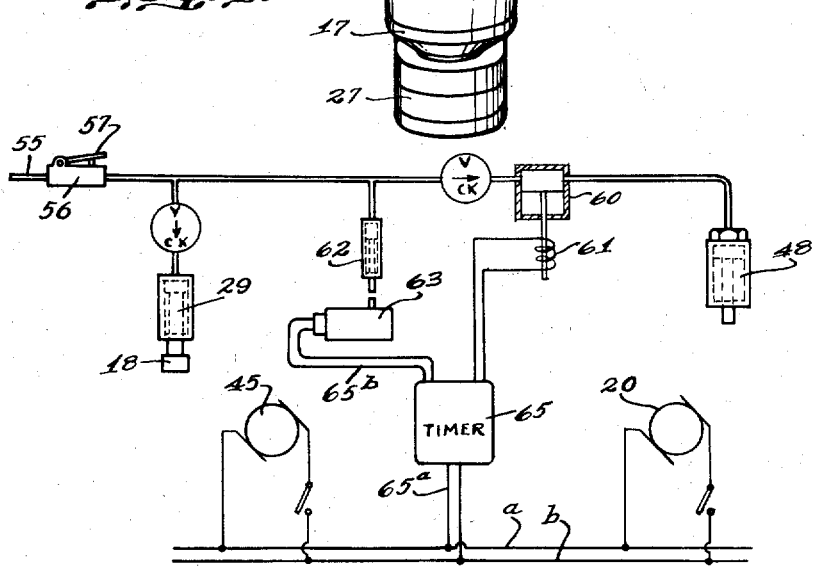
Fig. 5 is a piping and electric wiring diagram.

Referring to the diagram (Fig. 5) air pressure is supplied through a pressure line 55 to the piston motors 29 and 48. The pressure line is closed by a valve 56 operable by a foot pedal 57. When a bottle 16 has been placed by the operator on the continuously rotating base chuck 17 the operator depresses the foot pedal thereby supplying air pressure to the cylinder 29 and moving the head chuck 18 into contact with the bottle, clamping it against the rotating base chuck 17 so that the bottle is rotated. A solenoid valve 60 which remains in closed position while the solenoid 61 is deenergized, controls the air supply to the cylinder 48. When the foot pedal 57 is depressed, cylinder 62 receives air pressure and operates a switch or contact device 63. A timer 65 receives current from the mains a, b. The circuit extends through leads 65ª and through leads 65ᵇ and switch 63. The timer may be of conventional or well-known construction and operation. Such timers are supplied by the General Electric Company.

The motors 20 and 45 are driven by current supplied through the mains a and b. When the switch 63 is closed a circuit is established for the timer 65 which operates immediately following the operation of the cylinder 29 to establish a circuit for the solenoid 61. The valve 60 is thereby operated to open the pressure line to the cylinder 48 which then operates to move the decorating roll 30 downward into contact with the rotating workpiece. This contact, which takes place immediately or very shortly after the bottle is chucked and commences to rotate, is maintained for a predetermined length of time sufficient to permit one or more complete rotations of the workpiece while in contact with the decorating roll. The timer then operates to break the circuit of the solenoid 61 so that the valve 60 automatically closes. This cuts off the pressure supply to the motor 48, so that it lifts the decorating roll off the workpiece and into contact with the inking roll 40. The timer operates to retain the decorating roll in contact with each succeeding workpiece for the same optimum length of time, independently of the length of time the foot pedal is held down by the operator. This results in uniformity and accuracy of the markings or decorations. The decorating roll 30 is frictionally driven alternately by the inking roll 40 and the workpiece 16. As the roll 30 is free for rotation about its axis it accommodates itself to the speed of the workpiece 16 and contour of the surface to which the decoration is being applied.

Fig. 3A shows a modified form of printing roll 30a in which the peripheral surface of the roll is formed with circumferential grooves 30b dividing said surface into a plurality of comparatively narrow surfaces or bands 30c. In operation this roll applies a plurality of decorating lines or narrow bands surrounding the workpiece. Other designs, markings or surface decorations may be provided by forming the decorating rolls with the desired patterns.

Modifications may be resorted to within the spirit and scope of our invention as defined in the appended claims.

We claim:

1. A machine for decorating a round surface of a workpiece, comprising a carrier for the workpiece, a head chuck and a base chuck mounted on the carrier for rotation about a common axis, a fluid operated motor for moving the head chuck lengthwise of said axis into position to grip the workpiece between the chucks, a motor for rotating the base chuck and thereby rotating the workpiece held between the chucks, an inking roll spaced apart from the workpiece, a printing roll mounted for free rotation about its axis and positioned between the workpiece and the inking roll, a second fluid operated motor for moving the printing roll bodily from a position in contact with the inking roll to a position in contact with the workpiece, means providing a fluid pressure line through which fluid pressure is supplied to said fluid motors, a manually operable valve for opening the pressure line, and automatic means for causing the chuck operating fluid motor to chuck the workpiece in advance of the engagement of the decorating roll with the workpiece.

2. The machine defined in claim 1, comprising means for automatically withdrawing the decorating roll from the workpiece at a predetermined time interval following the engagement of the decorating roll with the workpiece.

3. A decorating machine comprising a carrier for a workpiece, a chuck on the carrier, means for rotating the chuck and a workpiece held thereby, a fluid operated motor operable to hold the workpiece on the chuck, a printing roll, an inking roll, the printing roll being mounted for free rotation about its axis, a second fluid operated motor, means providing operating connection between said second motor and the printing roll for moving the latter from a position in contact with the inking roll to a position in contact with the workpiece, means providing a fluid pressure line extending to said fluid operated motors, a manually operable valve for closing and opening said fluid pressure line, said fluid operated motors being operable in succession to chuck the workpiece for rotation and thereafter to move the decorating roll into engagement with the rotating workpiece when the pressure line is opened, and automatic means for retracting the decorating roll a predetermined time interval after its engagement with the workpiece.

4. A machine for decorating a round surface of a workpiece, said machine comprising a carrier for the workpiece, a head chuck and a base chuck mounted on the carrier for rotation about a common axis, first reciprocating power means operatively connected for moving one of said chucks lengthwise of said axis in relation to the other chuck into position to grip the workpiece between the chucks, a driving motor connected for rotating one of the chucks and thereby rotating the workpiece held between the chucks, an inking roll spaced apart from the workpiece, a decorating roll mounted for free rotation about its axis and positioned between the workpiece and inking roll, second reciprocating power means operatively connected for moving the decorating roll bodily from a position in contact with the inking roll to a position in contact with the workpiece, and automatic means for causing said first power means to move the chuck to chuck the workpiece and thereafter causing said second power means to move the decorating roll into engagement with the workpiece.

References Cited in the file of this patent

UNITED STATES PATENTS

| | | |
|---|---|---|
| 1,266,840 | Marten et al. | May 21, 1918 |
| 1,718,047 | Hunker | June 18, 1929 |
| 1,840,466 | Quigley | Jan. 12, 1932 |
| 1,980,639 | Schlesinger | Nov. 13, 1934 |
| 1,995,701 | Buttner | Mar. 26, 1935 |
| 2,202,799 | Jackson et al. | May 28, 1940 |
| 2,361,325 | Shurley | Oct. 24, 1944 |
| 2,540,554 | Shurley | Feb. 6, 1951 |
| 2,724,329 | Lucas | Nov. 22, 1955 |
| 2,819,670 | Newcomb et al. | Jan. 14, 1958 |